(12) United States Patent
Fischer et al.

(10) Patent No.: US 11,802,775 B2
(45) Date of Patent: Oct. 31, 2023

(54) METHODS AND SYSTEMS FOR DETERMINING SAFE RETURN RANGE

(71) Applicant: TomTom Navigation B.V., Amsterdam (NL)

(72) Inventors: Johannes Robert Fischer, Wandlitz (DE); Felix Godafoss König, Berlin (DE); Pawel Karol Pszona, Berlin (DE)

(73) Assignee: TomTom Navigation B.V., Amsterdam (NL)

( * ) Notice: Subject to any disclaimer, the term of this patent is extended or adjusted under 35 U.S.C. 154(b) by 177 days.

(21) Appl. No.: 16/096,275

(22) PCT Filed: May 4, 2017

(86) PCT No.: PCT/EP2017/060623
§ 371 (c)(1),
(2) Date: Oct. 24, 2018

(87) PCT Pub. No.: WO2017/191241
PCT Pub. Date: Nov. 9, 2017

(65) Prior Publication Data
US 2019/0145788 A1 May 16, 2019

Related U.S. Application Data

(60) Provisional application No. 62/334,429, filed on May 10, 2016, provisional application No. 62/331,916, filed on May 4, 2016.

(30) Foreign Application Priority Data

May 11, 2016 (GB) ...................................... 1608233

(51) Int. Cl.
*G01C 21/34* (2006.01)
*G01C 21/36* (2006.01)

(52) U.S. Cl.
CPC ..... *G01C 21/3469* (2013.01); *G01C 21/3655* (2013.01); *G01C 21/3676* (2013.01)

(58) Field of Classification Search
CPC ............ G01C 21/3469; G01C 21/3655; G01C 21/3676; G01C 21/34; G01C 21/36
See application file for complete search history.

(56) References Cited

U.S. PATENT DOCUMENTS 5,568,390 A * 10/1996 Hirota ................ G01C 21/3697
340/995.13
6,317,686 B1 * 11/2001 Ran ...................... G08G 1/0141
73/178 R
(Continued)

FOREIGN PATENT DOCUMENTS

JP  2014145748 A  8/2014
JP  2014215144 A  11/2014
(Continued)

OTHER PUBLICATIONS

Search Report for international application No. PCT/EP2017/060623 dated Aug. 9, 2017.
(Continued)

*Primary Examiner* — Sze-Hon Kong
(74) *Attorney, Agent, or Firm* — Park, Vaughan, Fleming & Dowler LLP

(57) ABSTRACT

A method is disclosed for determining and displaying an area comprising a plurality of locations that can be reached by a person or vehicle from a departure node or current position while still reaching a destination node or home location given the initial value at the departure node or current position of a parameter that constrains the distance travelable by the person or vehicle. The method may be implemented on a mobile device such as a portable naviga-
(Continued)

tion device and/or on a server or computer, or may be provided as a computer program product.

20 Claims, 3 Drawing Sheets

(56) References Cited

U.S. PATENT DOCUMENTS

| | | | | |
|---|---|---|---|---|
| 9,869,562 B2* | 1/2018 | Chin | | G01C 21/343 |
| 2001/0056443 A1* | 12/2001 | Takayama | | G01C 21/3644 |
| | | | | 715/244 |
| 2003/0006914 A1* | 1/2003 | Todoriki | | G01C 21/3676 |
| | | | | 340/995.21 |
| 2004/0174857 A1* | 9/2004 | Takaki | | G06Q 10/109 |
| | | | | 370/349 |
| 2005/0080558 A1* | 4/2005 | Kasai | | G01C 21/3492 |
| | | | | 701/423 |
| 2007/0198179 A1* | 8/2007 | Ishikawa | | G08G 1/096816 |
| | | | | 340/995.19 |
| 2007/0288155 A1* | 12/2007 | Kaneda | | G08G 1/096838 |
| | | | | 701/465 |
| 2008/0120021 A1* | 5/2008 | Kaneda | | G08G 1/096838 |
| | | | | 701/533 |
| 2009/0210146 A1* | 8/2009 | Chen | | G01C 21/343 |
| | | | | 701/533 |
| 2010/0094496 A1* | 4/2010 | Hershkovitz | | B60L 15/2045 |
| | | | | 701/22 |
| 2010/0138098 A1* | 6/2010 | Takahara | | G01C 21/3469 |
| | | | | 701/31.4 |
| 2011/0172905 A1 | 7/2011 | Schröder et al. | | |
| 2011/0202219 A1* | 8/2011 | Ishibashi | | B60L 53/68 |
| | | | | 701/22 |
| 2011/0241905 A1* | 10/2011 | Niwa | | G01C 21/3682 |
| | | | | 340/995.1 |
| 2012/0158227 A1* | 6/2012 | Tate, Jr. | | B60L 50/62 |
| | | | | 701/22 |
| 2012/0179311 A1* | 7/2012 | Skaff | | B60L 58/12 |
| | | | | 701/22 |
| 2012/0194346 A1* | 8/2012 | Tsai | | G01C 21/3469 |
| | | | | 340/636.1 |
| 2012/0290506 A1* | 11/2012 | Muramatsu | | G01C 21/3476 |
| | | | | 705/412 |
| 2013/0218458 A1* | 8/2013 | Scholl | | G01C 21/32 |
| | | | | 701/426 |
| 2014/0052373 A1* | 2/2014 | Hoch | | G08G 1/096822 |
| | | | | 701/533 |
| 2014/0052374 A1* | 2/2014 | Hoch | | A61B 5/18 |
| | | | | 701/533 |
| 2014/0156108 A1* | 6/2014 | Reich | | G01C 21/3682 |
| | | | | 701/1 |
| 2014/0163861 A1* | 6/2014 | Beaurepaire | | G06Q 50/00 |
| | | | | 701/400 |
| 2014/0172282 A1* | 6/2014 | Feng | | B60L 58/12 |
| | | | | 701/117 |
| 2014/0172285 A1* | 6/2014 | Kuhn | | G01C 21/3469 |
| | | | | 701/123 |
| 2014/0336918 A1* | 11/2014 | Wan | | G01C 21/3446 |
| | | | | 701/400 |
| 2014/0379253 A1* | 12/2014 | Ota | | G01C 21/3469 |
| | | | | 701/439 |
| 2015/0345977 A1* | 12/2015 | Saito | | B60L 3/00 |
| | | | | 701/521 |
| 2016/0076899 A1 | 3/2016 | MacNeille et al. | | |
| 2016/0110997 A1* | 4/2016 | Ur | | G01C 21/3492 |
| | | | | 701/23 |
| 2016/0123754 A1 | 5/2016 | Li | | |
| 2016/0257294 A1* | 9/2016 | Morisaki | | B60W 10/08 |
| 2016/0321764 A1* | 11/2016 | Cardoso | | G01C 21/3676 |
| 2016/0349075 A1* | 12/2016 | Son | | G01C 21/3697 |
| 2017/0010125 A1* | 1/2017 | Adachi | | B60L 15/2045 |
| 2017/0108348 A1* | 4/2017 | Hansen | | H04W 4/024 |
| 2017/0138750 A1* | 5/2017 | Weber | | G01C 21/3469 |
| 2017/0146356 A1* | 5/2017 | Huber | | G01F 9/001 |
| 2017/0230792 A1* | 8/2017 | Shaik | | H04W 4/022 |
| 2018/0108260 A1* | 4/2018 | Kuhara | | G08G 5/0047 |
| 2018/0120117 A1* | 5/2018 | Grein | | G08G 1/096866 |
| 2018/0340783 A1* | 11/2018 | Suzuki | | G01C 21/3469 |
| 2020/0258399 A1* | 8/2020 | Kuhara | | G05D 1/0016 |
| 2021/0165544 A1* | 6/2021 | Gross | | G06F 3/0488 |

FOREIGN PATENT DOCUMENTS

| | | |
|---|---|---|
| WO | 2014001565 A1 | 1/2014 |
| WO | 2015132931 A1 | 9/2015 |

OTHER PUBLICATIONS

Search Report for GB application No. 1608233.1 dated Nov. 17, 2016.

* cited by examiner

METHODS AND SYSTEMS FOR DETERMINING SAFE RETURN RANGE

CROSS-REFERENCE TO RELATED APPLICATIONS

The present application is a National Stage of International Application No. PCT/EP2017/060623, filed on May 4, 2017, and designating the United States, which claims benefit to U.S. Patent Application 62/331,916 filed on May 4, 2016; U.S. Patent Application 62/334,429 filed on May 10, 2016; and United Kingdom Patent Application 1608233.1 filed on May 11, 2016. The entire content of these applications is incorporated herein by reference.

FIELD OF THE INVENTION

The present invention relates generally to methods for determining an area which may be travelled within when travelling between a departure node and a destination node. The present invention also extends to mobile devices, optionally portable navigation systems, systems and computer program products for implementing such methods. The methods may be computer implemented. Illustrative embodiments of the invention relate to portable navigation devices (so-called PNDs), in particular PNDs that include Global Positioning System (GPS) signal reception and processing functionality. Other embodiments relate, more generally, to any type of mobile processing device that is configured to execute navigation software so as to provide route planning, and preferably also navigation, functionality.

BACKGROUND OF THE INVENTION

Portable navigation devices (PNDs) that include GPS signal reception and processing functionality are well known and widely employed as in-car or other vehicle navigation systems.

In general terms, a modern PND comprises a processor, memory (at least one of volatile and non-volatile, and commonly both), and map data stored within the memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical.

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above provide a reliable means for enabling users to navigate from one position to another.

A navigation user may often be concerned about how far they can travel in a vehicle given a particular constraint. For example, it is important for a user to know how far they can travel based on the current fuel load of petrol, diesel, etc. in the case of a conventional combustion engine vehicle, or in the increasingly common case of an electric vehicle (EV) the amount of the charge current carried by the vehicle batteries. Such a concern is commonly referred to as "range anxiety", where the user is concerned about reaching a destination, such as a home location or a charging point, without becoming stranded.

Simplistically, a 360 degree reachable range based upon the current vehicle location and fuel load could be displayed to the user on a map. For instance, EP 0638887 A2 describes one method of calculating and displaying a reachable range for a certain amount of residual fuel. An improved method that also takes into account route planning preferences of the navigation device is described in WO 2014/001565 A1. EP 1926074 A1 discloses a map displaying device including search means for calculating travel time information regarding a travel time to an arbitrary point accessible from a particular reference point, i.e. the current position of a user's vehicle.

However, these methods only display information relating to the currently reachable area from the device and do not provide any information regarding whether the user can reach a given segment on a map and then still reach the desired destination given the current fuel load or other constraint. This may be referred to as the "safe return range" between the current position of the device and the desired destination given the current fuel load or other constraint.

Ideally, both of the currently reachable range from the vehicle and the safe return range from which the destination can still be reached would be maintained simultaneously so that both ranges can be displayed to the user together, or at least both be immediately available for separate display to the user. Unfortunately, however, determining the area that can be reached from a given point is inherently computationally expensive. Calculating a safe return range may involve having to determine a reachable area for each of a large number of locations within a map region, e.g. all possible locations within the currently reachable range, and is even more prohibitively expensive. Hence, it is not generally feasible to expend the amount of effort required for the computation of both the currently reachable area and the safe return range using conventional techniques. This is especially the case for mobile devices with limited processing power such a driver's smartphone.

The present invention therefore aims to provide an improved method and system for reducing so-called "range anxiety".

SUMMARY OF THE INVENTION

In accordance with a first aspect of the present invention there is provided a method for determining an area which may be travelled within when travelling between a departure node and a destination node, the method comprising:

determining or retrieving data indicative of a first boundary enclosing a first area around the destination node that is representative of the locations from which a person or vehicle may travel to the destination node given a first value of a parameter, wherein the value of the parameter constrains the distance travelable by the person or vehicle;

estimating a value of the parameter when the person or vehicle is at a first location within the first boundary, other than the departure and destination nodes, based on an initial value of the parameter at the departure node and the estimated change in value of the parameter associated with travelling from the departure node to the first location; and comparing the estimated value of the parameter at the first location with the first value to determine whether the first location can be reached by the person or vehicle from the departure node while still reaching the destination node, given the initial value of the parameter.

The embodiments allow a determination of whether any particular location can be reached from a departure node whilst still reaching the destination node, given the initial value at the departure node of some parameter—the value of which constrains the distance travelable by the person or vehicle. The totality of these locations therefore represents the area within which the person or vehicle can travel whilst still reaching the destination node, and so this determination can help reduce the range anxiety of a user.

Furthermore, and importantly, this determination can be made with a relatively low computational overhead through a relatively simple comparison between the expected value of the parameter at a given location (e.g. the first location) after travelling from the departure node to that location and the value of the parameter associated with the boundary that first location is within. For instance, if the expected value of the parameter at the first location is such that it is determined that the destination node can be reached from the first location, then the first location is within a safe return range of the destination node. By way of example, where the parameter is a charge level of an electric vehicle, if the expected remaining charge level at the first location lying within the first boundary is 50%, and the first boundary represents that only 10% charge is required to reach the destination node, then the first location would be determined to be reachable from the departure node whilst still reaching the destination node. Because the first area around the destination node is associated with a particular value of the parameter and is pre-determined (i.e. determined or obtained in an initial step of the method), it is then only necessary to check whether the first location falls within the first area, and compare the two values as described above. It will be appreciated that the determination of whether the first location can be reached from the departure node while still reaching the destination node given the initial value of the parameter may thus be determined directly via this comparison, without e.g. having to separately compute the reachable area from the first location. This reduces the computational overhead of the method, particularly when the method is repeated to determine if other locations can be reached from the departure node whilst still reaching the destination node, given the initial value of the parameter.

The safe return range comprising the plurality of locations that may be reached from the departure node while still reaching the destination node given the initial value of the parameter may thus be determined relatively simply, in such a manner that it may even be implemented on a mobile device with relatively limited processing power.

It will be understood that the term "safe return range" as used herein refers to the range of locations that can be reached from the departure node whilst still reaching the destination node given the initial value of the parameter.

The value of the parameter constrains the distance travelable by the person or vehicle from a particular starting position. The first boundary therefore represents the maximally reachable points from which the person or vehicle may travel to the destination node given the first value of the parameter. Similarly, the plurality of different boundaries around the destination node referred to below represent the maximally reachable points from which the person or vehicle may travel to the destination node given the respective values of the parameter associated with each of the different boundaries. A particular boundary around the departure node may generally be constructed using a plurality of points around the destination node, with the points being interconnected to define the shape of the boundary. It will be appreciated that a boundary need not necessarily be a complete continuous boundary surrounding the destination node, e.g. where the boundary is only determined in certain directions from a particular node. It will also be appreciated that where a determination is being made in real time, it may not be practical to determine the full extent of the boundary before a change in the initial value of the parameter or the departure node occurs.

In general, it is contemplated that the distance travelable may be constrained by one or more parameter, and the method may therefore take into account more than one parameter. However, typically, only a single constraining parameter will be taken into account.

In general, the method may relate to a method for determining an area which may be travelled within when travelling between a departure node and a destination node based on digital map data, wherein the digital map data comprises a plurality of links connected by nodes representing navigable paths of a network. The departure node, destination node and first location may therefore each comprise a respective link or node within the network. The boundaries and areas around a node may therefore similarly comprise a number of links or nodes within the network.

A boundary around a given node associated with a particular value of a parameter that constrains the distance travelable, as described herein, may generally be determined using any suitable method for determining the distance travelable from (or to) the node based on the particular value of the parameter. For instance, in embodiments, it is contemplated that the boundaries may be determined based on the respective value(s) of the parameter and a route-planning algorithm that takes into account route-planning preferences of the or a navigation device associated with the person or vehicle. The route-planning algorithm may e.g. take into account a route-planning function such as the length, travel time and/or travel speed associated with each of a plurality of links defining a route extending around a particular node in order to preferentially select the shortest, fastest, or most fuel or energy efficient routes between the node and any particular location from which a person or vehicle may travel to the node given a first value of the parameter. Generally, the algorithm will explore links around the destination node using a one-to-many searching algorithm. For any given route between the destination node and a location, each of the links along the route will be assigned a certain value or cost in terms of the parameter and optionally in terms of a route-planning function, such that the route has an accumulated value or cost in terms of the parameter and optionally in terms of the route-planning function. A boundary associated with a certain value of the parameter may thus be determined by the endpoints of routes whose accumulated cost or value of the parameter matches that value. Typically, the algorithms used to determine the reachable area or boundary may explore links that are closer to the destination node in more detail than links that are further away.

The first boundary and/or the plurality of boundaries may be determined as a first step of the method, or may be pre-determined, with data indicative of the boundaries being retrieved (e.g. from a persistent memory of a device implementing the method, or from an external server) and then used in the subsequent step of comparison. It will be appreciated that because the destination node is typically a fixed point, the reachable area around the destination node does not tend to change drastically over time, so that the determined reachable areas or boundaries around the destination node can be re-used, or at least re-determined with relatively little computational overhead, for multiple distinct instances of travel through the map region.

The destination node is typically a fixed location on the map, e.g. corresponding to a home location, or some other predetermined location. For example, in the case where the parameter is a fuel load of a vehicle or a level of charge of an electric vehicle, the destination node may comprise a particular re-fueling or re-charging point. It will be appreciated that because the location of the destination node is typically fixed, the reachable boundaries around the destination node may be expected to remain relatively constant over time.

It is also contemplated that there may be multiple fixed destination nodes, and the method may determine the safe return range to any or all of these. For instance, the method may change the destination node being used in real time upon moving out of the safe return range of one destination node but into the safe return range of another destination node. Alternatively, the safe return ranges associated with different destination nodes may be visualised together using e.g. different colours on a map.

The first location is generally a location within the currently reachable area from the departure node. The first location also lies within a reachable area (i.e. the first area, within the first boundary) around the destination node. For other locations within the currently reachable area from the departure node that do not lie within a reachable area or boundary of the destination node, it would not be possible to safely return to the destination node, so these will always be outside of the safe return range.

The method may generally be a method for determining an area which may be travelled within when travelling between a departure node and a destination node for a mobile navigation device, or a vehicle to which the mobile navigation device is mounted. The device may be a portable navigation device (PND), e.g. of the type described in the background section above.

It will be appreciated that e.g. the value of the parameter at the first location is only an estimate of the expected value of the parameter at the first location, and that, for instance, a change in the traffic conditions may cause a deviation from the estimated value. Thus, the method may be considered to be a method of approximating an area which may be travelled within when travelling between a departure node and a destination node given an initial value of a parameter that constrains the distance travelable by a person or vehicle.

In embodiments, the method comprises determining or retrieving data indicative of a plurality of different boundaries around the destination node, each different boundary associated with a different respective value of the parameter, the different boundaries enclosing areas around the destination node that are representative of the locations from which a person or vehicle may travel to the destination node given the value of the parameter associated with that boundary, wherein the method further comprises determining between which two adjacent of the boundaries the first location lies, and comparing the estimated value of the parameter at the first location with the value of the parameter associated with the outer boundary and/or the inner boundary of the two boundaries to determine whether the first location can be reached by the person or vehicle from the departure node while still reaching the destination node, given the initial value of the parameter.

Typically, the comparison is made between the estimated value of the parameter at the first location and the value of the parameter associated with the outer boundary of the two boundaries between which the first location lies. Thus, the inner boundary effectively serves only to identify which outer boundary to use in the comparison. However, it will be appreciated that the comparison may also or additionally be based on the value of the parameter associated with the inner boundary of the two boundaries between which the first location lies. The outer boundary is the boundary that is furthest away from the destination node.

Each boundary may be associated with a progressively increasing value of the parameter such that each boundary represents a progressively increasing distance travelable from the destination node. For example, the boundaries may be concentrically arranged around the destination node. However, it will be appreciated that depending on how the parameter is defined, each boundary may be associated with a progressively decreasing value of the parameter such that each boundary represents a progressively increasing distance travelable from the destination node.

The plurality of boundaries generally represents a series of progressively increasing travelable distances to the destination node such that adjacent boundaries define a series of ring-like areas around the destination node. The method may thus comprise determining which of the ring-like areas a particular location lies within, and comparing the expected value of the parameter at that location with a value of the parameter associated with that ring-like area. Adjacent ring-like areas may be associated with a range of travelable distances corresponding to adjacent ranges or values of the parameter. That is, each ring-like area represents an additional reachable range associated with changing the value of the parameter. For instance, the ring-like area defined between an inner boundary associated with a first value of the parameter and an outer boundary associated with a second values of the parameter represents the additional travelable distance associated with changing the value of the parameter from a value less than (or equal to) the first value to a value between the first value and the second value.

In embodiments, the method further comprises:

estimating a value of the parameter when the person or vehicle is at a second location within the first boundary and/or between an adjacent two of the plurality of boundaries, other than the departure and destination nodes and the first location, based on an initial value of the parameter at the departure node and the estimated change in value of the parameter associated with travelling from the departure node to the second location; and comparing the estimated value of the parameter at the second location with the first value and/or with the value of the parameter associated with the outer boundary and/or the inner boundary of the two boundaries to determine whether the second location can be reached by the person or vehicle from the departure node while still reaching the destination node, given the initial value of the parameter.

The second location may be within the first area enclosed by the first boundary, or may be within a different area defined between an adjacent two of the plurality of boundaries. The method may thus comprise comparing the estimated value of the parameter at the second location with the value of the parameter associated with the area within which it lies to determine whether the second location can be reached by the person or vehicle from the departure node while still reaching the destination node, given the initial value of the parameter.

The method may comprise estimating a value of the parameter when the person or vehicle is at a third or further location (other than the departure and destination nodes and the first and second locations) within the first boundary and/or between an adjacent two of the plurality of boundaries based on an initial value of the parameter at the departure node and the estimated change in value of the parameter associated with travelling from the departure node to the third or further location; and comparing the estimated value of the parameter at the third or further location with the value of the parameter associated with the first boundary and/or with the outer boundary and/or the inner boundary of the two boundaries to determine whether the third or further location can be reached by the person or vehicle from the departure node while still reaching the destination node, given the initial value of the parameter.

The method may comprise performing the steps of estimating a value of the parameter and comparing the estimated value of the parameter described above at each of a plurality of locations.

The method typically involves determining whether the first and second, or the first, second, third and further, locations can be reached by the person or vehicle from the same departure node, i.e. when the departure node is at a single fixed location. This may then be repeated for the (or different) first, second, third and/or further locations for a different departure node e.g. as the departure node moves or is updated, as discussed in more detail below.

In embodiments, the method comprises determining an area around the departure node representative of the locations from which the person or vehicle may travel from the departure node based on the initial value of the parameter; and determining, using the first boundary and/or at least some of the plurality of different boundaries, for each of a plurality of the locations within the area around the departure node whether each of the plurality of locations can be reached while still reaching the destination node.

The area around the departure node representative of the locations from which the person or vehicle may travel from the departure node based on the initial value of the parameter may be determined using any suitable method e.g. for determining a currently reachable area around the departure node. For instance, the currently reachable area based on the initial value of the parameter may be determined using the same methods used to determine the boundary or boundaries around the destination node.

For each of the plurality of locations, it may first be determined whether or not the location lies within a reachable area or boundary of the destination node.

If a particular location is outside the furthest reachable area to the destination node (i.e. outside the boundary associated with the maximum (or minimum) value of the parameter), then that location could never be reached from the departure node while still reaching the destination node. Locations falling outside of the furthest reachable area to the destination node may be disregarded, or may be included in the analysis but e.g. compared with an effectively infinite value of the parameter such that they would always be determined to be not reachable given the current value of the parameter.

However, for locations that do fall within a reachable area or boundary of the destination node (i.e. within the first boundary and/or one or more of the plurality of boundaries), the method may proceed as above, such that the value of the parameter at the location can be compared with the value of the parameter associated with the area around the destination node within which the location falls so as to determine whether or not it is possible to still reach the destination node.

It will be appreciated that the area around the departure node representative of the locations from which the person or vehicle may travel from the departure node based on the initial value of the parameter essentially represents the currently reachable area from the departure node. Thus, the embodiments allow the safe return range to the destination node to be directly computed based on the determination of the currently reachable area without significantly increasing the computational effort.

The area around the departure node representative of the locations from which the person or vehicle may travel from the departure node based on the initial value of the parameter may be determined using live positional data, e.g. live GPS data, reflective of the current or recent traffic conditions within the region of the map containing the departure and destination nodes.

In embodiments, the method further comprises using the method to create map data of, and/or display an area, comprising locations between the departure node and destination node that can be reached from the departure node whilst still reaching the destination node based on the initial value of the parameter, optionally in real-time.

The created map data may e.g. be maintained for subsequent display to a user, e.g. upon a user selecting that information for display. By displaying the area comprising locations between the departure node and destination node that can be reached from the departure node whilst still reaching the destination node based on the initial value of the parameter, the user is provided with a visual approximation of the areas that can be reached whilst still reaching the destination node, thus helping to reduce the driver's range anxiety. The area may be visualised and displayed in any suitable manner. Generally, the area will be defined by a plurality of discrete points, with at least some of these points being interconnected to shape the area.

The departure node and initial value of the parameter may change over time, in which case the method may be performed continuously such that the safe return range is continually re-determined. The area that is to be displayed may therefore change in real time as the departure node and/or initial value of the parameter change.

In embodiments, the method comprises creating map data of, and/or displaying the or an area around, the departure node representative of the range from which the person or vehicle may travel from the departure node based on the initial value of the parameter.

The range may correspond to the currently reachable area around the departure node. Optionally, the map data of this range, or this range may be displayed in real-time. The currently reachable area from the departure node and the safe return area to the destination node may be simultaneously available for display or may be displayed simultaneously.

In embodiments, the departure node is a current position of the person or vehicle, and wherein the initial value is the current value of the parameter.

The method may then comprise repeating the steps of estimating the value of the parameter at the first location and comparing the estimated value of the parameter at the first location with the first value in real time as the current position and current value of the parameter changes.

The current position of the person or vehicle may be determined from live positional data, e.g. provided by GPS, that is continuously or periodically updated as the person or vehicle moves within the environs of the map region.

The steps of estimating the value of the parameter and comparing the estimated value of the parameter may be repeated at the or a second or further location, with the estimated value of the parameter at the second or further location being compared with the value of the parameter associated with the area or boundary within which the second or further location lies.

In embodiments, (i) the parameter may be a fuel load or an electric charge level; and/or (ii) the parameter may be representative of a travel time or a travel distance; and/or (iii) the first value of the parameter may be the travel time or distance from the first boundary to the destination node, the initial value of the parameter may be a desired or maximum travel time or distance, and the estimated value of the parameter at the first location may be an estimated remaining travel time or distance after travelling from the departure node to the first location.

For example, where the parameter is a travel time, the constraint may be a desired maximum travel time or a desired arrival time at the destination node. Similarly, where the parameter is a travel distance, the constraint may be a desired maximum travel distance. Where the parameter is a fuel load or electric charge level, the constraint may be the initial or current value of the fuel load or electric charge level.

The value of the parameter may essentially progressively decrease without increasing (or progressively increase without decreasing) over time as the person or vehicle moves from the departure node to the destination node. The method may determine whether a particular location can be reached by the person or vehicle from the departure node while still reaching the destination node without, e.g. a step of refuelling or recharging the vehicle at a dedicated refuelling or recharging point.

The destination node may be a fixed location and/or the boundary or boundaries around the destination node may be determined using, or retrieved from, stored or historic data.

The destination node may be a fixed location on the map such that the first boundary and/or the plurality of boundaries around the destination node may be expected to not change significantly over time. Hence, the boundaries may be determined using or retrieved from stored or historic data and this may still provide a good approximation of the safe return range. The stored or historic data may be re-used or used multiple times over an extended period of time, e.g. corresponding to multiple distinct performances of the method or multiple distinct journeys within the map region.

The position of the destination node and the boundaries around the destination node may be stored semi-permanently e.g. in a persistent memory of a mobile device such that this data is retained for subsequent use even after the method is complete and/or the mobile device is turned off.

From another aspect, there is provided a mobile device, optionally a portable navigation device, for navigating between a departure node and a destination node comprising:
 a memory; and
 a processor, wherein the processor is configured to:
 determine or retrieve data indicative of a first boundary enclosing a first area around the destination node that is representative of the locations from which a person or vehicle carrying the device may travel to the destination node given a first value of a parameter, wherein the value of the parameter constrains the distance travelable by the person or vehicle carrying the device;
 estimate a value of the parameter when the person or vehicle carrying the device is at a first location within the first boundary, other than the departure and destination nodes, based on an initial value of the parameter at the departure node and the estimated change in value of the parameter associated with travelling from the departure node to the first location; and
 compare the estimated value of the parameter at the first location with the first value to determine whether the first location can be reached by the person or vehicle carrying the device from the departure node while still reaching the destination node, given the initial value of the parameter.

From a further aspect, there is provided a system for navigating between a departure node and a destination node comprising:
 a mobile device having a memory and a processor; and
 a server, wherein the mobile device is configured to communicate with the server;
 wherein the server and/or the processor is arranged and configured to:
 determine or retrieve data indicative of first boundary enclosing a first area around the destination node that is representative of the locations from which a person or vehicle carrying the device may travel to the destination node given a first value of a parameter, wherein the value of the parameter constrains the distance travelable by the person or vehicle carrying the device;
 estimate a value of the parameter when the person or vehicle carrying the device is at a first location within the first boundary, other than the departure and destination nodes, based on an initial value of the parameter at the departure node and the estimated change in value of the parameter associated with travelling from the departure node to the first location; and
 compare the estimated value of the parameter at the first location with the first value to determine whether the first location can be reached by the person or vehicle carrying the device from the departure node while still reaching the destination node, given the initial value of the parameter.

The mobile device may e.g. be a user's smartphone or smartwatch running appropriate software. Alternatively, the mobile device may be a dedicated portable navigation device, e.g. having any of the features described in the background section above. Generally, the mobile device will have a GPS functionality and access to live data relating to the region surrounding the mobile device. This live data may be communicated to the mobile device via a wireless connection from an external server. Typically, the mobile device will have a display so that the safe return range may be visualised or displayed to the user.

The processor may be arranged and configured to provide the functionality recited above, with the server merely providing information or data for use by the processor in performing these steps. For example, the server may provide live data representative of current map conditions that may be used to estimate the value of the parameter. In other embodiments, some or all of the recited functionality may be provided at the server, with the results or data indicative of the results then being communicated to the mobile device, e.g. for subsequent use by the processor and/or subsequent display to the user. It is also contemplated that the server and processor may be arranged and configured to co-operate so as to provide the recited functionality.

The processor and/or server may also or additionally be arranged and configured to perform any or all of the method steps described above in relation to the first aspect, at least to the extent that they are not mutually exclusive. Again, these steps may be performed directly by the processor of the mobile device or, alternatively, the method steps may be performed by the server, with the results or data indicative of the results then being communicated to the mobile device e.g. for subsequent display to the user.

In embodiments, data indicative of the first boundary enclosing the first area around the destination node may be stored in a persistent memory portion of the memory.

In other embodiments, data indicative of the first boundary enclosing the first area around the destination node may be retrieved from the server or from an external server.

It will be appreciated that where a plurality of boundaries around the destination node are used, data indicative of each of the plurality of boundaries may either be stored in a persistent memory portion of the memory or may be retrieved from the server or from an external server.

From a yet further aspect, there is provided a computer-implemented method for determining an area which may be travelled within when travelling between a departure node and a destination node comprising a method substantially as described above.

From another aspect, there is provided a computer program product comprising computer readable instructions that, when executed on a computer, cause the computer to perform a method substantially as described above.

The aspects and embodiments of the present invention as set out above can be additionally or alternatively described in the following manner.

In accordance with another aspect of the present invention there is provided a method of determining a first boundary enclosing a portion of a geographic area containing a navigable network representing the area that is reachable from a first location on the navigable network while still allowing a second location on the navigable network to be reached given a value of a parameter that limits the amount of the navigable network that can be traversed, the navigable network being represented by an electronic map comprising a plurality of segments representing navigable elements of the navigable network, the method comprising:

determining a position on a segment representative of the first location and obtaining the value of the parameter at said determined position;

exploring the segments of the electronic map from the determined position representative of the first location using a search algorithm having an associated cost function and, for segments that are explored and determined to be reachable, wherein a segment is reachable if it is associated with a value of the parameter due to traversing an optimum cost route from the determined position representative of the first location that is less than the obtained value of the parameter, determining if a segment lies within a second boundary that is associated with a value of the parameter greater than the difference between the obtained value of the parameter and the value of the parameter associated with the segment, wherein the second boundary is one of a plurality of predetermined second boundaries, each being associated with a different value of the parameter, and that each enclose a portion of the geographic area around the second location representing the area from which the second location can be reached given the associated value of the parameter; and using the segments determined to be within the second boundary to determine the first boundary.

The present invention provides a method of determining a so called "safe return range", i.e. the portion of a navigable network that can be reached from a first location, such as a current location, while still allowing a second location, such as a predetermined 'home' location, to be reached given a value of parameter that limits the amount of the navigable network that can be traversed. As will be discussed in more detail below, the parameter can be a fuel load or energy level of a vehicle, or in other embodiments it may be a maximum time or distance that can be taken in a journey, and thus the value of the parameter associated with the first location, e.g. current location, can reflect a current fuel load or energy level of the vehicle (i.e. a value between zero, i.e. empty, and a maximum value, i.e. full) or a remaining distance or time that can be travelled.

The present invention extends to a system for carrying out a method in accordance with any of the aspects or embodiments of the invention herein described.

Thus, in accordance with a further aspect of the invention there is provided a system for determining a first boundary enclosing a portion of a geographic area containing a navigable network representing the area that is reachable from a first location on the navigable network while still allowing a second location on the navigable network to be reached given a value of a parameter that limits the amount of the navigable network that can be traversed, the navigable network being represented by an electronic map comprising a plurality of segments representing navigable elements of the navigable network, the system comprising:

means for determining a position on a segment representative of the first location and obtaining the value of the parameter at said determined position;

means for exploring the segments of the electronic map from the determined position representative of the first location using a search algorithm having an associated cost function and, for segments that are explored and determined to be reachable, wherein a segment is reachable if it is associated with a value of the parameter due to traversing an optimum cost route from the determined position representative of the first location that is less than the obtained value of the parameter, determining if a segment lies within a second boundary that is associated with a value of the parameter greater than the difference between the obtained value of the parameter and the value of the parameter associated with the segment, wherein the second boundary is one of a plurality of predetermined second boundaries, each being associated with a different value of the parameter, and that each enclose a portion of the geographic area around the second location representing the area from which the second location can be reached given the associated value of the parameter; and means for using the segments determined to be within the second boundary to determine the first boundary.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa. The present invention is a computer implemented invention, and any of the steps described in relation to any of the aspects or embodiments of the invention may be carried out under the control of a set of one or more processors. The means for carrying out any of the steps described in relation to the system may be a set of one or more processors.

The system of the present invention in any of its aspects or embodiments may be in the form of any suitable device, such as a navigation device. In general, the system of the present invention may be at least one processing device. The or a processing device may be a device of a mobile device, such as a navigation device, whether a portable navigation device (PND) or an integrated device, or may be a device of a server.

In preferred embodiments the method of the present invention in any of its aspects or embodiments is carried out using a mobile device, such as a navigation device, and the present invention extends to a mobile, e.g. navigation device arranged to carry out the steps of the method of any of the aspects or embodiments of the invention. The navigation device may be a portable navigation device (PND) or an integrated, e.g. in-vehicle, device.

In accordance with any of the aspects or embodiments of the invention the system, e.g. navigation device, may comprise a display for displaying an electronic map to a user, together with at least a representation of the determine first boundary, a set of one or more processors configured to access electronic map data and cause an electronic map to be displayed to a user via the display, and a user interface operable by a user to enable the user to interact with the device.

Regardless of its implementation, a device, e.g. navigation apparatus, used in accordance with the present invention in any of its aspects or embodiments may comprise a processor, memory, and digital map data (or electronic map) stored within said memory. The processor and memory cooperate to provide an execution environment in which a software operating system may be established. One or more additional software programs may be provided to enable the functionality of the apparatus to be controlled, and to provide various other functions. The device, e.g. navigation apparatus, may preferably include global navigation satellite system (GNSS), e.g. GPS or GLONASS, signal reception and processing functionality. As will be appreciated the device may use other means for determining its current location as desired, e.g. terrestrial beacons, the mobile telecommunications network, etc. The apparatus may comprise one or more output interfaces by means of which information may be relayed to the user. The output interface (s) may include a speaker for audible output in addition to the visual display. The apparatus may comprise input interfaces including one or more physical buttons to control on/off operation or other features of the apparatus.

In other embodiments the method of the present invention in any of its aspects or embodiments may be carried out by a server, and the present invention extends to a server arranged to carry out the steps of the method of any of the aspects or embodiments of the invention. The system of the present invention of any of its aspects or embodiments may be a system e.g. processing device of a server. Of course, the steps of the method of the present invention in any of its aspects or embodiments may be carried out in part by a server and in part by a navigation apparatus. For example, the first boundary may be determined by a server, e.g. at the request of a navigation device, and provided to the device for output to a user. The steps of the method may be performed exclusively on a server, or some on a server and the others on a navigation device in any combination, or exclusively on a navigation device. Performance of one or more of the steps on the server may be efficient and may reduce the computational burden placed on a navigation device. Alternatively if one or more steps are performed on the navigation device, this may reduce any bandwidth required for network communication. Thus, the system of the present invention may be provided in part by a navigation device or other mobile device, and in part by a server.

The navigable network is represented by an electronic map. The electronic map comprises a plurality of segments connected by nodes. The electronic map (or mathematical graph, as it is sometimes known), in its simplest form, is effectively a database containing data representative of nodes, most commonly representative of road intersections, and lines between those nodes representing the roads between those intersections. In more detailed digital maps, lines may be divided into segments defined by a start node and end node. These nodes may be "real" in that they represent a road intersection at which a minimum of 3 lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. The nodes and segments are further defined by various attributes which are again represented by data in the database. For example, each node will typically have geographical coordinates to define its real-world position, e.g. latitude and longitude. Nodes will also typically have manoeuvre data associated therewith, which indicate whether it is possible, at an intersection, to move from one road to another; while the segments will also have associated attributes such as the legal speed limit, etc. The segments also have an associated traversal direction, the traversal direction indicates the possible direction(s) that the segment can be travelled along. For example, when the navigable network is a road network, a segment may be representative of a one-way road, or it may be representative of the lanes on one side of a highway, and thus the segment would be monodirectional, i.e. allowing travel from one node to another node, but not in the other direction. Alternatively, and as is typically more often the case, the segment may be bi-directional, i.e. allowing travel from one node to another node, and vice versa. A bi-directional segment can therefore always be an outgoing segment from an area of a soft location, but this is not the case with a mono-directional segment.

While embodiments of the present invention are described with reference to road segments, it should be realised that the invention may also be applicable to other navigable segments, such as segments of a path, river, canal, cycle path, tow path, railway line, or the like. For ease of reference these are commonly referred to as a road segment, but any reference to a "road segment" may be replaced by a reference to a "navigable segment" or any specific type or types of such segments.

In the present invention, data representative of a first location is obtained. The first location preferably is a current location of a user or mobile device, but it can be any location from which a user desires to start a journey. The data representative of the first location can therefore be obtained from a position determining means of the mobile device, such as a GNSS receiver, in the case where the first location is a current location of the mobile device. Alternatively, the data representative of the first location can be based on information received from a user, e.g. where the user provides an address or marks a location on a representation of an electronic map. The data representative of the first location is used to determine a position on a segment of the electronic map that corresponds to the first location. The position on the segment can be a position along the segment, or can be one or other of the nodes defining the segment. A value of the parameter at the position on the segment, i.e. at the first location, is also obtained. The value of the parameter can be received from the vehicle, e.g. when the device is operably connected to the vehicle, either by a wired or wireless connection. This can be the case, for example, where the parameter reflects a current fuel or energy level of the vehicle. Alternatively, the value of the parameter can be received from a user, e.g. with the user providing the value using suitable input means of the device. This can be case, for example, where the parameter reflects a remaining (or maximum) time or distance to be travelled. As will be appreciated, the value of the parameter that is obtained, either automatically or based a received user input, will preferably be a value between zero (e.g. representing an empty fuel tank) and a maximum value (e.g. representing a full fuel tank). It will also be appreciated that the value of the parameter can be based on received information, e.g. from the vehicle or user, such that the value of the parameter used in the method may not directly match the value that is received.

In the present invention, segments of the electronic map are explored from the determined position using a search (or route planning) algorithm having an associated cost function. The search algorithm preferably comprises an undirected search, and thus operates to identify optimum paths or routes, e.g. typically minimum cost paths, through the electronic map (and thus through the navigable network) from the determined position representative of the first location. The search (or route planning) algorithm is thus preferably a "forwards" search, since the intended direction of travel is outwards from the first location. The search is undirected in that there is no predetermined destination or goal. In other words, the search algorithm can be thought of as a one-to-many algorithm, and thus operates to identify optimum paths or routes from the determined position representative of the first location to a plurality of nodes of the electronic map. As will be appreciated a one-to-many route planning algorithm is distinguished from a one-to-one route planning algorithm in that the latter algorithm is designed to determine an optimum path between two positions in the electronic map. The route planning algorithm of the present invention can take any suitable form as desired, such as one based on Dijkstra's algorithm or similar. The optimum (or minimum cost) routes referred to herein, and which are determined by the route planning algorithm, are optimal by reference to the associated cost function. The cost function may be predetermined, or be selected by the user as desired, and may aim to identify routes between two locations having, for example, a shortest distance between the two locations, a fastest travel time between the two locations, a minimum fuel consumption between the two locations, or any combination of these as desired. The cost of a route may be determined as the sum of the cost of traversing the at least one segment forming the route, wherein the cost for traversing each segment is determined using the cost function and typically at least one attribute associate with the respective segment, e.g. a length of the segment, an expected speed of travel along the segment, changes in elevation along the segment, a curvature (or shape) of the segment, etc.

The exploration step comprises determining whether segments that are explored by the route planning algorithm are reachable from the position representative of the first location given the obtained value of the parameter at the first location. As discussed above, a segment is determined to be reachable if it is associated with a value of the parameter due to traversing an optimum, e.g. minimum, cost route from the position representative of the first location that is less than the obtained value of the parameter. In other words, for each segment that is explored, there is a determined a path comprising one or more segments from the position representative of the first location that is optimum in terms of cost, e.g. is a minimum cost route. As will be appreciated, each of the one or more segments forming the path to a particular segment results in a value of the parameter being associated with traversing the navigable network from first location to the navigable element of the network represented by the segment in question. In other words, traversing the navigable network requires, for example, a certain amount of time, distance or fuel to be consumed. Thus, for example, the cost function associated with the route planning algorithm is used to determine a first cost for traversing a segment, while an objective function is used to determine a second cost for traversing the segment, e.g. where the second cost is one of a time, distance, fuel or energy. The optimum path to the segment being, for example, the path with the minimum accumulated first cost. In such embodiments, the parameter associated with an explored segment is the accumulated second costs of the one or more segments forming the optimum path to the segment from the position associated with the first location, e.g. the time needed to traverse the path, the distance of the path, the fuel needed to traverse the path, etc. It will therefore be understood that the search algorithm preferably comprises an undirected forwards search that stops when the parameter exceeds the obtained value on all explored paths.

Since the present invention includes determining whether explored segments are reachable, the method of determining the first boundary that is representative of the safe return range can also include determining a third boundary enclosing a portion of the navigable network in the geographic area that is representative of reachable area from the first location given the obtained value of the parameter at the first location. Indeed, preferably the first and third boundaries are determined in the method of the present invention, such that representations of both boundaries can be displayed, e.g. simultaneously displayed, to a user.

As discussed above, the first and/or third boundaries enclose a portion of the geographic area. The boundaries can be defined in any suitable and desired manner. For example, the boundaries can be defined by a plurality of discrete locations, such as a plurality of nodes of the electronic map, with the boundary being defined by interconnecting these locations. For example, in the case of the first boundary, the node of the segment along each of the explored paths that is furthest from the first location can be used as the plurality of discrete locations. For example, and as described in WO 2014/001565 A1, the entire content of which is incorporated herein by reference, the portion of the geographic area around the first location can be divided into a plurality of sectors, e.g. 16 sectors, and, for each sector, the furthest most point of the determined boundary, e.g. node, from the first location is stored. The discrete locations, e.g. nodes, are preferably connected by lines, e.g. arcs, so as to form a continuous boundary.

In the present invention, for segments that are explored and deemed to be reachable, the method comprises determining if segments lie within a second boundary that is associated with a value of the parameter greater than the value of the parameter associated with the respective segment. The second location is preferably a location selected by a user, and preferably one that represents a location that is commonly used by the user. For example, the second location could be a 'home' location, and thus the safe return range is the area that is reachable from the first location, e.g. current location, on the navigable network while still allowing the home of the user to be reached. It will be appreciated, however, that the second location could be any predetermined location, such as a user's 'work' location, or a family member's house.

The second boundary is one of a plurality of predetermined second boundaries, each of which is associated with a different value of the parameter. Each second boundary encloses a portion of the geographic area around the second location representing the area from which the second location can be reached, such that the plurality of second boundaries effectively form a series of rings or layers around the second location. Data indicative of the plurality of second boundaries is preferably stored in a memory of the device. The data is preferably stored in a non-volatile memory, e.g. such that the data is retained in memory upon the device being powered off and on. The method preferably comprises determining the plurality of second boundaries.

The determination of a second boundary for a value of the parameter preferably comprises determining a position on a segment representative of the second location, and exploring the segments of the electronic map from the determined position representative of the second location using a search (or route planning) algorithm having an associated cost function. The search algorithm preferably comprises an undirected search, and thus operates to identify optimum paths or routes, e.g. typically minimum cost paths, through the electronic map (and thus through the navigable network) that end in the determined position representative of the second location. The search (or route planning) algorithm is thus preferably a "backwards" search, since the intended direction of travel is towards the second location. The search is undirected in that there is no predetermined destination or goal. In other words, the search algorithm can be thought of as a one-to-many algorithm, and thus operates to identify optimum paths or routes from a plurality of nodes of the electronic map to the determined position representative of the second location. The route planning algorithm of the present invention can take any suitable form as desired, such as one based on Dijkstra's algorithm or similar. As discussed above, the optimum (or minimum cost) routes referred to herein, and which are determined by the route planning algorithm, are optimal by reference to the associated cost function. The cost function may be predetermined, or be selected by the user as desired, and may aim to identify routes between two locations having, for example, a shortest distance between the two locations, a fastest travel time between the two locations, a minimum fuel consumption between the two locations, or any combination of these as desired. The cost of a route may be determined as the sum of the cost of traversing the at least one segment forming the route, wherein the cost for traversing each segment is determined using the cost function and typically at least one attribute associate with the respective segment, e.g. a length of the segment, an expected speed of travel along the segment, changes in elevation along the segment, a curvature (or shape) of the segment, etc. In preferred embodiments, the same cost function is associated (and used) with the search (or route planning) algorithm used to determine the first boundary, and optionally also the third boundary, as is associated (and used) with the search (or route planning) algorithm used to determine the plurality of second boundaries.

The exploration step of the method used to determine the plurality of second boundaries comprises determining whether the position representative of the second location is reachable from a segment given a predetermined value of the parameter. The second location is determined to be reachable from a segment if the value of the parameter due to traversing an optimum, e.g. minimum, cost route from the segment is less than the predetermined value of the parameter. Conversely the second location is determined not to be reachable if the value of the parameter due to traversing an optimum, e.g. minimum, cost route from the segment is greater than the predetermined value of the parameter. In other words, for each segment that is explored, there is a determined a path comprising one or more segments from the segment to the position representative of the second location that is optimum in terms of cost, e.g. is a minimum cost route. As will be appreciated, each of the one or more segments forming the path to the position representative of the second location is associated with a value of the parameter, e.g. since traversing the navigable network requires, for example, a certain amount of time, distance or fuel to be consumed. Thus, for example, the cost function associated with the route planning algorithm is used to determine a first cost for traversing a segment, while an objective function is used to determine a second cost for traversing the segment, e.g. where the second cost is one of a time, distance, fuel or energy. The optimum path to the segment being, for example, the path with the minimum accumulated first cost. In such embodiments, the parameter associated with an explored segment is the accumulated second costs of the one or more segments forming the optimum path from the segment to the position associated with the second location, e.g. the time needed to traverse the path, the distance of the path, the fuel needed to traverse the path, etc. It will therefore be understood that the search algorithm preferably comprises an undirected backwards search that stops when the parameter reaches a maximum value on all explored paths, e.g. full, since the parameter is taken as zero, e.g. empty, at the second location. The reachability range defined by the complete search preferably forms the outermost second boundary, and the other second boundaries are at intermediate parameter values between zero and the maximum value.

Each of the second boundaries is associated with a different value of the parameter, such that the second boundaries effectively form a series of layers or rings around the second location. For example, in embodiments where the parameter is representative of a fuel load or energy level of a vehicle, the outermost second boundary, i.e. the one enclosing the largest portion of the geographic area, is representative of the portion of the navigable network from which the second location can be reached given a maximum amount of fuel or energy. The remaining second boundaries represent progressively smaller portions of the geographic area as they are associated with a fuel or energy levels of the vehicle less than the maximum amount. For example, a boundary may be determined for 10%, 20%, 30% . . . to 100% full fuel or energy levels of the vehicle. It will be understood, however, that any number of boundaries could be determined as desired, e.g. a boundary could be determined for 5 km or 10 km distance intervals, i.e. fuel or energy levels equivalent to such distance ranges, from the second location to a maximum reachable distance. In embodiments where the parameter is indicative of a time or distance that can be taken for a journey, i.e. with the obtained value of the parameter being a maximum time or distance, and wherein the obtained value is one selected from a predetermined range, the plurality of second boundaries could be determined for selected time or distance intervals within the predetermined range.

In embodiments, the plurality of second boundaries can be recalculated whenever a predetermined trigger event occurs. The trigger event could be one or more of the following: a change in the second location; a change in the electronic map; a change in a selected cost function to be used in the route planning algorithm; when the mobile device (on which the method is executed) is restarted, i.e. is turned 'on' from an 'off' state; and when the software application (performed the method) is opened, i.e. is executed by a software launcher application. As will be appreciated, by triggering the recalculation of the plurality of second boundaries each time the mobile device and/or software application is started, this allows the plurality of second boundaries to be kept relatively up-to-date with current conditions on the navigable network, e.g. road closures, significant traffic congestion events, etc.

It will be understood by those skilled in the art, that the route planning algorithm used to determine the first boundary, and optionally the third boundary, preferably always take account of real-time traffic and other travel conditions on the navigable network (when available), whereas since the plurality of second boundaries are predetermined and stored then they will not always be representative of current traffic and travel conditions on the navigable network. The safe return range determined by the method of the present invention will typically therefore be an estimation of the actual range. Accordingly, in embodiments, the parameter used in the present invention may not correspond to an actual fuel or energy level of the vehicle, but may include a buffer, such that, for example, the outermost second boundary may correspond to 95% fuel or charge level, rather than 100% fuel or charge level.

Each of the plurality of second boundaries enclose a portion of the geographic area, and can be defined in any suitable and desired manner. For example, the boundaries can be defined by a plurality of discrete locations, such as a plurality of nodes of the electronic map, with the boundary being defined by interconnecting these locations. For example, and as described in WO 2014/001565 A1, the portion of the geographic area around the second location can be divided into a plurality of sectors, e.g. 16 sectors, and, for each sector, the furthest most point of the determined boundary, e.g. node, from the second location is stored. The discrete locations, e.g. nodes, are preferably connected by lines, e.g. arcs, so as to form a continuous boundary.

As discussed above, in the present invention, for segments that are explored and deemed to be reachable, the method comprises determining if the segment lies within a second boundary that is associated with a value of the parameter greater than the difference between the obtained value of the parameter and the value of the parameter associated with the segment. Each second boundary, again as discussed above, is representative of the portion of the geographic area, and thus portion of the navigable network, from which the second location can be reached given the value of the parameter associated with the specific second boundary in question. Therefore, and as will be appreciated, as paths are explored out from the position representative of the first location, at some point along each path there will be identified a segment that falls within the appropriate second boundary and therefore from which the second location can be reached, whereas the next segment in the path (away from the first location) does not fall within the second boundary and therefore from which the second location can't be reached.

In an embodiment of the present invention, the location of the current segment being explored is compared to the geographic extent of the plurality of second boundaries to identify the outermost boundary within which the segment can be found. The difference between the obtained value of the parameter and the value of the parameter associated with the segment, i.e. the difference value, can then preferably be compared to the parameter associated with the identified boundary. In the event that the difference value is greater than the parameter associated with the boundary, then the segment is within the safe return range; otherwise it can be determined that the segment is outside of the safe return range. In embodiments the node between a segment along a path that is within the second boundary and an adjacent (or neighbouring) segment along the path that is at least partially outside of the second boundary can be used, together with the nodes for all other paths, to determine the discrete points that define the boundary of the safe return range.

In other embodiments of the present invention, the second boundary is preferably selected from the plurality of second boundaries based on the difference value. The selected second boundary is preferably the second boundary associated with a value of the parameter closest to the difference value, and more preferably the second boundary associated with a value of the parameter closest to, and also less than, the difference value. In other words, the selected second boundary is the outermost second boundary associated with a value of the parameter less than the difference value for the segment in question. Accordingly, if the segment is located within the geographic area enclosed by the selected second boundary, then it is possible to reach the second location by traversing the navigable network, and thus the segment should be used to determine the first boundary. Conversely, if the segment is located outside the geographic area enclosed by the selected second boundary, then it is not possible to reach the second location by traversing the navigable network, and thus the segment should not be used to determine the first boundary.

In embodiments of the present invention, information representative of at least some, and preferably all, of the first boundary, or the area enclosed thereby, is displayed to a user on a display, e.g. associated with the mobile device. Additionally, in embodiments, information representative of at least some, and preferably all, of the third boundary, or the area enclosed thereby, is displayed to a user on the display, e.g. associated with the mobile device, preferably simultaneously with the information representative of the first boundary. As will be appreciated, the plurality of second boundaries are intended to be used to determine the first boundary, and preferably are not intended to be displayed to the user. In embodiments where the method is performed by a mobile device, then the first and/or third boundaries, or portions thereof, can be displayed on a display of the mobile device. Alternatively, in embodiments where the method is performed by a server, then the information representative of at least some, and preferably all, of the first and/or third boundaries, or the area or areas enclosed thereby, can be transmitted to a mobile device for display thereon.

As will be appreciated, and in embodiments wherein the first location is representative of a current location of a mobile device, the method is preferably repeated as the location of the mobile device changes, such that the first boundary, and optionally the third boundary, is continually recalculated and preferably the most recently calculated boundary or boundaries shown in the user. The method may be performed at any desired frequency, e.g. after a certain period of time, after a certain distance has been travelled, after a certain amount of fuel or energy has been used, etc.

In embodiments, it is envisaged that the method may extend to determining and/or accessing data indicative of a plurality of second boundaries for each a plurality of second locations. A safe return range can therefore be determined, for example, for a user's 'home', 'work', 'gym', etc as desired. In such embodiments, the method may include obtaining a selection of one of a plurality of predetermined second locations, e.g. based on a received user input, and performing the above described method in respect of the selected predetermined second location.

Any of the methods in accordance with the present invention may be implemented at least partially using software e.g. computer programs. The present invention thus also extends to a computer program comprising computer readable instructions executable to perform, or to cause a navigation device and/or server to perform, a method according to any of the aspects or embodiments of the invention.

The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Regardless of its implementation, an navigation apparatus used in accordance with the present invention may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include GPS (Global Positioning System) signal reception and processing functionality. The apparatus may comprise one or more output interfaces by means of which information may be relayed to the user. The output interface (s) may include a speaker for audible output in addition to the visual display. The apparatus may comprise input interfaces including one or more physical buttons to control on/off operation or other features of the apparatus.

In other embodiments, the navigation apparatus may be implemented at least in part by means of an application of a processing device which does not form part of a specific navigation device. For example the invention may be implemented using a suitable computer system arranged to execute navigation software. The system may be a mobile or portable computer system, e.g. a mobile telephone or laptop, or may be a desktop system.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

Advantages of these embodiments are set out hereafter, and further details and features of each of these embodiments are defined in the accompanying dependent claims and elsewhere in the following detailed description.

BRIEF DESCRIPTION OF THE DRAWINGS

Various embodiments will now be described, by way of example only, and with reference to the accompanying drawings in which.

DETAILED DESCRIPTION OF THE PREFERRED EMBODIMENTS

Figure 1:
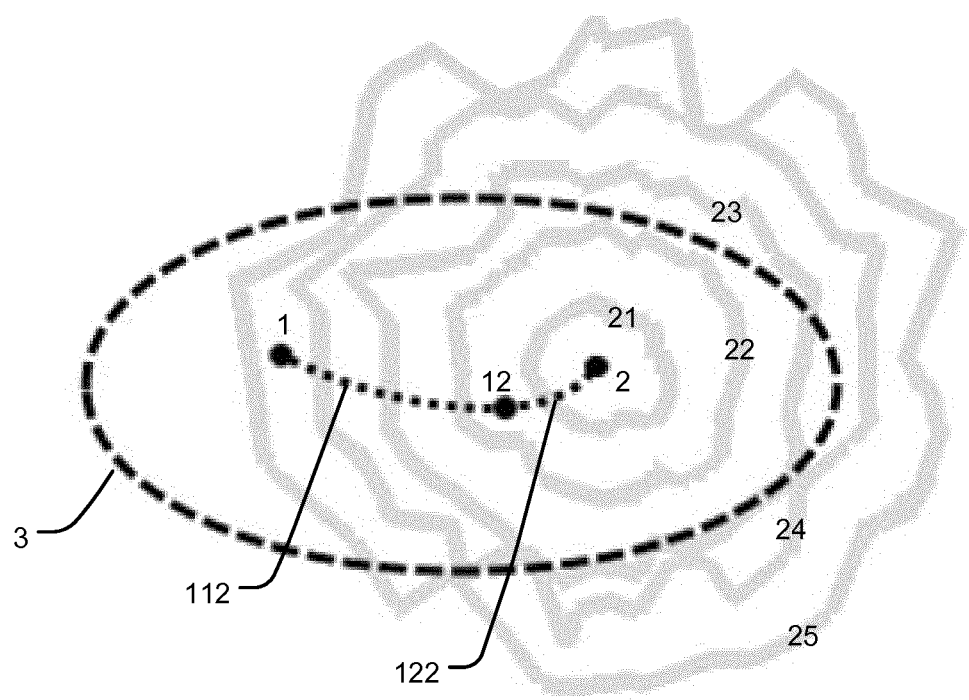
FIG. 1 is a schematic representation of one embodiment of the present invention.

Embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

The embodiments of the present invention allow a determination of an approximation of the area which can be reached from a current position (departure node) whilst still reaching a home or any other predefined location (destination node), given the current value of a parameter that constrains the reachable distance. This so-called "safe return range" may then be visualised or displayed to a user on a map in order to help reduce their range anxiety. For example, where the parameter is a current fuel load or electric charge level of a vehicle, the safe return range representing the range of locations between the current location and the home location that can be safely reached whilst still reaching the home location without running out of fuel or charge can be displayed.

Although in the embodiments of the present invention described below the parameter is the charge level of an electric vehicle, it will be appreciated that the techniques described herein are not limited to this context and may also be applied with any other suitable constraint. For example, the parameter may be representative of a travel time or distance. Naturally, the maximum travel time or distance may be related to the current fuel load or charge level, as a certain fuel load or charge level will provide a certain amount of reach or travel time. However, it is also contemplated that the constraint could simply be a time by which the home location must be reached or the distance the user wants to travel, e.g. by running. It will also be appreciated that there may be multiple constraining factors or parameters, and the techniques described herein may generally take one or more of these into account.

In the embodiments of the present invention, the safe return range is essentially computed in two steps using a computation of the currently reachable area. First, a series of boundaries are obtained or determined representing the areas from which the home location can be reached for different respective pre-defined values of the parameter (e.g. charge level). For instance, the boundaries may be obtained or determined for a series of discretely increasing values of the parameter. Then, the currently reachable area around the current position of the vehicle or device is determined based on the current value of the parameter (e.g. the current charge level). Because the boundaries of the reachable areas around the home location for different values of the parameter have already been obtained or determined in the first step, it is then easy to determine whether or not any given position within the currently reachable area is also within a reachable area to the home location given the current value of the parameter by simply comparing the estimated value of the parameter at that position with the value of the parameter required to reach the home location from that position (as determined using the boundaries obtained from the first step). Thus, it is not required to separately compute both the currently reachable range and the safe return range. A determination of whether any given position is within a safe return range of the home location can be made directly from the calculation of the currently reachable area without significantly increasing the computational effort.

This method is illustrated schematically in FIG. 1 for the case of an electric vehicle whose travelable distance is constrained by the level of charge stored in the battery.

FIG. 1 schematically shows a region of map data around a fixed home location 2, wherein a vehicle has a current position 1. Although not shown in FIG. 1, it will be appreciated that the region generally contains a network comprising a series of interconnected nodes and links, i.e. roads and junctions, within which the vehicle may travel along. Thus, the vehicle is constrained to travel along certain links, and generally there may be no straight line path between any two nodes or points within the region. A series of boundaries 21, 22, 23, 24, 25 around the home location 2 are illustrated, with each boundary 21, 22, 23, 24, 25 enclosing an area representing the distance from which the home location 2 can be reached with progressively increasing levels of charge. For instance, the first boundary 21 may represent a series of points from which the home location 2 can just be reached with 20% charge remaining. The second boundary 22 may then represent a series of points from which the home location 2 can just be reached with 40% charge remaining, the third boundary 23 with 60% charge remaining, the fourth boundary 24 with 80% charge remaining and the fifth boundary 25 with a fully charged (100%) battery. For points that lie outside of the fifth boundary 25, i.e. that would require greater than 100% charge to travel to the home location 2, the home location 2 is not reachable (unless e.g. the battery is recharged), so these points always lie outside of the safe return range.

It will be appreciated that each boundary 21, 22, 23, 24, 25 encloses an area representing the locations that can potentially be reached with the charge level associated with that boundary. The ring-like areas defined between adjacent boundaries thus define the locations that can be reached with the range of charge levels as defined between the two boundaries. For example, the ring defined between the first 21 and second 22 boundaries represents the additional area that is reachable with 40% charge, relative to the area enclosed by the first boundary 21 that represents the area that is reachable with 20% charge. It will be appreciated that the shape and extent of the boundaries 21, 22, 23, 24, 25 is generally determined using the map data, and a route searching algorithm, as discussed in more detail below, and so is generally a polygon of arbitrary shape, representative of the routes through the network between the home location 2 and the boundary used to determine the boundary. However, in its simplest implementation, the boundaries could just be approximated as a series of circles around the home location.

FIG. 1 also shows the currently reachable area 3 around the current position 1, which may be determined in real-time based on map data, such as live map data, and the current charge value. The current position 1 of the vehicle may be determined using GPS data. It will be understood that "live" map data refers to information relating to current or relatively current conditions in the map region, including e.g. traffic and weather conditions that may affect the travel times and/or speeds throughout the links of the network of the map region. Such live data may be provided to the device via i.e. downloaded from an external server, as is known in the art, and may be updated regularly. Using the boundaries 21, 22, 23, 24, 25, the safe return range to the home location 2 for any given location 12 within the currently reachable area 3 can easily be determined. For instance, for a given position 12 within the currently reachable area 3, it is straightforward to determine between which two of the boundaries 21, 22, 23, 24, 25 around the home location the position 12 lies within, i.e. in the illustrated case, the location 12 lies between the first 21 and second 22 boundaries. To determine whether the position 12 is within the safe return range to the home location 2, all that is then required is to compare the expected remaining charge after travelling (e.g. along route 112) from the current position 1 to that position 12 with the charge value associated with the corresponding boundary 22. For instance, if the remaining charge level at the position 12 was 50%, then it would be possible to reach that position 12 from the current position 1 while still reaching the home location 2 (e.g. by travelling along route 122, which may be selected using a route planning algorithm as being the shortest route between the position 12 and the home location 2), since the position 12 lies within the 40% boundary around the home location 2. However, if the remaining charge at the position 12 was only 20% (or less), then the home location 2 would not be reachable, as the position lies beyond the 20% boundary.

It will be appreciated that the accuracy of the approximation may in principle be increased by using more or more closely spaced boundaries, e.g. corresponding to smaller increments of charge value. However, it will also be appreciated that the boundaries themselves are only an approximation, and that the expected charge value at any given position is at most an estimate. Because the boundaries are only an approximation, it may be desired to include some buffer with the charge level associated with each boundary, such that the boundary 21 identified to the user as the 20% charge level may actually correspond e.g. to an 18% charge level. It may also be desired to display to the user for a particular location the confidence level associated with that location being within the safe return range. For example, a location that is determined to only just be within the safe return range may be indicated in a different shade or colour to a location that is expected to be well within the safe return range.

Figure 2:
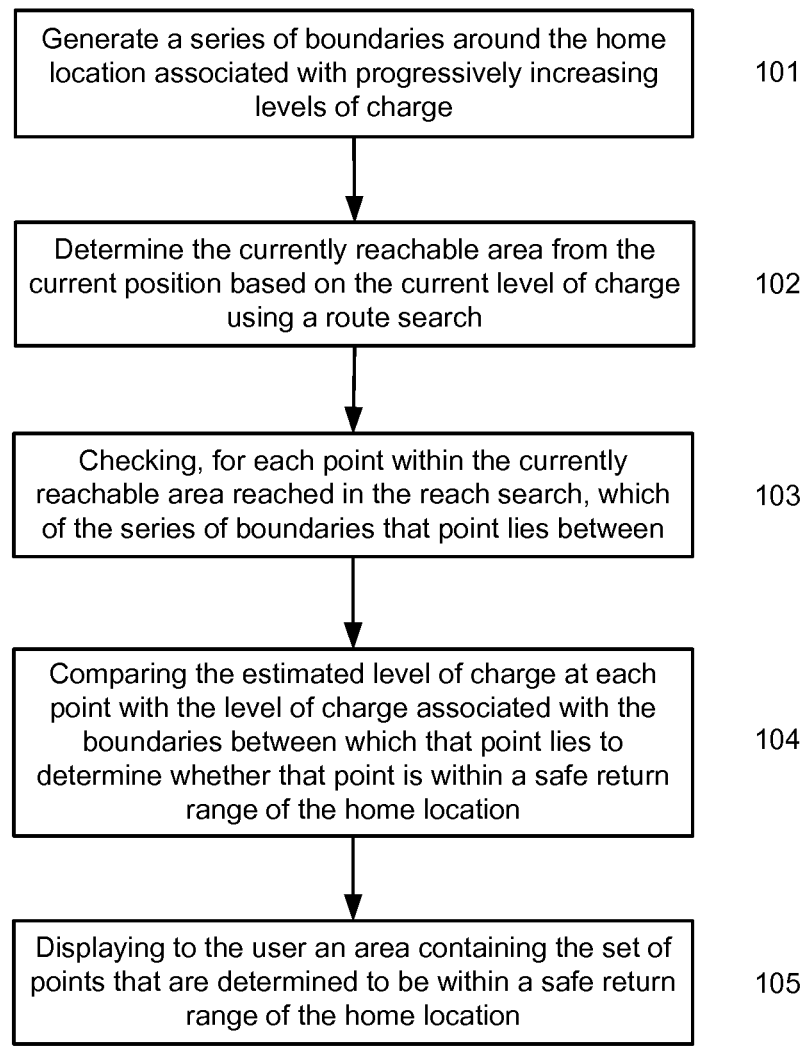
FIG. 2 is a flowchart illustrating an embodiment of the present invention.

FIG. 2 is a flowchart illustrating the embodiment described above in relation to FIG. 1 in more detail. Again, therefore, FIG. 2 describes an embodiment relating to determining the safe return range to a home location for a PND mounted within an electric vehicle.

In a first step 101, a "backwards" route search is performed from the home location to generate a series of boundaries each associated with a progressively increasing level of charge (e.g. or kilometres of reach). Each boundary therefore encloses an area comprising the locations that are reachable given a particular level of charge. The series of boundaries therefore define a series of concentric or ring-like areas around the home location, each ring-like area associated with a different range of charge values (i.e. those associated with the two adjacent boundaries defining that ring-like area). For example, the ring-like area enclosed between the 20% and 40% boundaries represents the additional locations from which the home location can be reached with up to 40% charge, relative to those locations enclosed by the 20% boundary from which the home location can be reached with up to 20% charge.

The boundaries that enclose the reachable areas for a given level of charge may be determined by any suitable method including, for instance, those described in WO 2014/001565. In general terms, for the purposes of the present invention, a boundary around a given node (e.g. the home location) for a particular value of the constraining parameter may be determined using a one-to-many searching algorithm that explores many possible links extending away from a single node and assigns each link a cost in terms of the constraining parameter, such that each route comprised of a series of connected links has an associated accumulated cost corresponding to the cost associated with traversing each link along that route. Any given point at the end of a route is thus determined to be reachable so long as the accumulated cost does not exceed a certain threshold value relating to the initial value of the parameter at the node. A particular boundary associated with a certain value of the parameter is thus determined using the set of points that are just reachable with that value of the parameter. These maximally reachable point locations may be connected to define the boundary, e.g. for visualisation purposes, as described in more detail below in relation to step 105.

For example, where the constraining parameter is the level of charge of an electric vehicle, as in the particular embodiments described above, the searching algorithm proceeds by searching on a map to explore links extending from the node and assigning each link a cost in terms of the charge level, i.e. the amount of charge required to traverse that link. For the particular case of electric charge, it will be appreciated that the battery may be recharged, e.g. if the electric vehicle is travelling downhill, such that the cost associated with a link may be positive or negative. Any given route from the node to a particular point on the map therefore has an associated cost representing the accumulated cost for traversing each of the links along the route. That point is determined as being reachable, given the particular level of charge at the node, so long the accumulated cost to reach the point from the node does not exceed the level of charge at the node. The set of points that are just reachable with a certain level of charge define the boundary associated with that level of charge. It will be appreciated that where the parameter is not the level of charge, the determination of a reachable boundary may proceed similarly. For instance, where the constraining parameter is time, the boundary may be determined using the time taken to traverse each link, and hence the total time to traverse each route.

The determination of the reachable area may also be based on one or more route planning criteria. That is, the searching algorithm may also take into account the routing preferences of the navigation system as well as the constraining parameter. For instance, the route planning algorithm may direct the user along routes having the shortest travel time or distance, or which are the most energy or fuel efficient, or may direct the user away from certain road types. The route planning criteria may be defined in terms of a cost of a route planning function. For example, where the route planning criteria is to determine the fastest route between the node and a particular point, each link may be assigned a cost based on the time taken to travel that link, and the route is selected based on the series of links that minimise the accumulated travel time along the route. Other route planning criteria may assign a cost based e.g. on the length of the link, the average speed along the link, or the expected fuel or energy consumption associated with traversing the link. A suitable searching algorithm taking into account routing preferences as well as the constraining parameter may therefore involve assigning each link a first cost in terms of the parameter (i.e. charge) and a second cost using a cost function associated with the routing algorithm, such that each route has a first accumulated cost in terms of the parameter and a second accumulated cost being the minimum/maximum accumulation of second costs. The reachable area is then defined by the plurality of points that can be reached based on the initial value of the parameter along routes that are selected based on a route planning criteria, e.g. along the shortest or fastest route.

Since the home location is generally a fixed location that does not change often, it can be assumed that the reachable areas from the home location for the particular values of charge do not vary drastically. Hence, the series of boundaries and/or reachable areas about the home location determined in step 101 may be stored in a persistent memory of the mobile device, such that they survive rebooting of the device. The boundaries and/or reachable areas may only need to be re-calculated under certain circumstances such as a change in home location, or a change in map data, etc. Hence, the boundaries and/or series of areas determined in step 101 may be retrieved from the memory of the device without having to re-compute these. This advantageously further reduces the computational load.

In a second step 102, once the reachable areas associated with the home location are determined and/or retrieved, the currently reachable area from the current position of the device based on the current charge level is calculated by a route search. The determination of the currently reachable area may be performed in the manner described above, and optionally also takes into account routing preferences of the navigation device. For each point in the currently reachable area reached in the route search, the expected remaining value of the charge at that point is determined, based on the cost associated with reaching that point from the current position.

At step 103, for each point in the currently reachable area reached in the route search, a check is performed as to which of the ring-like areas around the home location contains that point, i.e. which of the adjacent boundaries that point lies between. A comparison is then made (step 104) between the expected remaining charge level of the electric vehicle at the point and the charge level associated with the ring-like area/boundaries within which that point lies. Through this comparison, it is therefore possible to easily determine whether or not any given point in the currently reachable area is also within the safe return range of the home location. For example, if at a given segment the expected remaining charge level of the electric vehicle is 50%, and that segment lies within the 40% reachable area of the home location, the home location will be reachable. However, if that segment lies within the 60% reachable area of the home location, the home location is not reachable.

If the method is left to run indefinitely, or e.g. is performed off-line, these checking and comparison steps (steps 103 and 104) may be performed for every point within the currently reachable area. However, especially where the method is performed in real-time, this step may be performed only for some of the points that are within the currently reachable area. Typically, the checking and comparison steps (steps 103 and 104) will be performed for each point in the currently reachable area as and when that point is reached by the route searching algorithm, i.e. whilst the route search (step 102) is on-going. It will be appreciated that the checking and comparison steps (steps 103 and 104) are relatively simple, and can readily therefore be performed during the route search (step 102) without significantly increasing the computational load or processing time.

The safe return range comprising the currently reachable points from which the home location is still reachable given the current level of charge as determined in step 104 is then visualised and displayed to the driver at step 105. Any suitable technique may be used to visualise and display the safe return range. For example, the same visualisation techniques used to draw the currently reachable range (e.g. those described in WO 2014/001565) can be used to visualise the safe return range. The safe return range and the currently reachable range may be simultaneously displayed to the driver, or at least simultaneously available so that the driver can switch between the displays immediately. Generally, the currently reachable area and/or the safe return range will comprise a plurality of discrete point locations. The area/range may then be shaped by interconnecting these point locations, or a selected number of these point locations. For instance, the visualisation process may involve dividing the region around the current position into a plurality of sectors, with a point location from each sector being used to visualise the area. The resolution of the display can be increased by increasing the number of sectors/points used in the visualisation process. This is described in WO 2014/001565. For ease of visualisation, the discrete points used to shape the area may be connected by arcuate lines to provide a smooth area, reflective of the approximate safe return range. The accuracy or confidence level associated with the safe return range may be indicated on the display by means of shading or colouring. For instance, for points close to the boundary of the safe return range, a lighter/darker shade may be used than points that are well within the safe return range.

Figure 3:
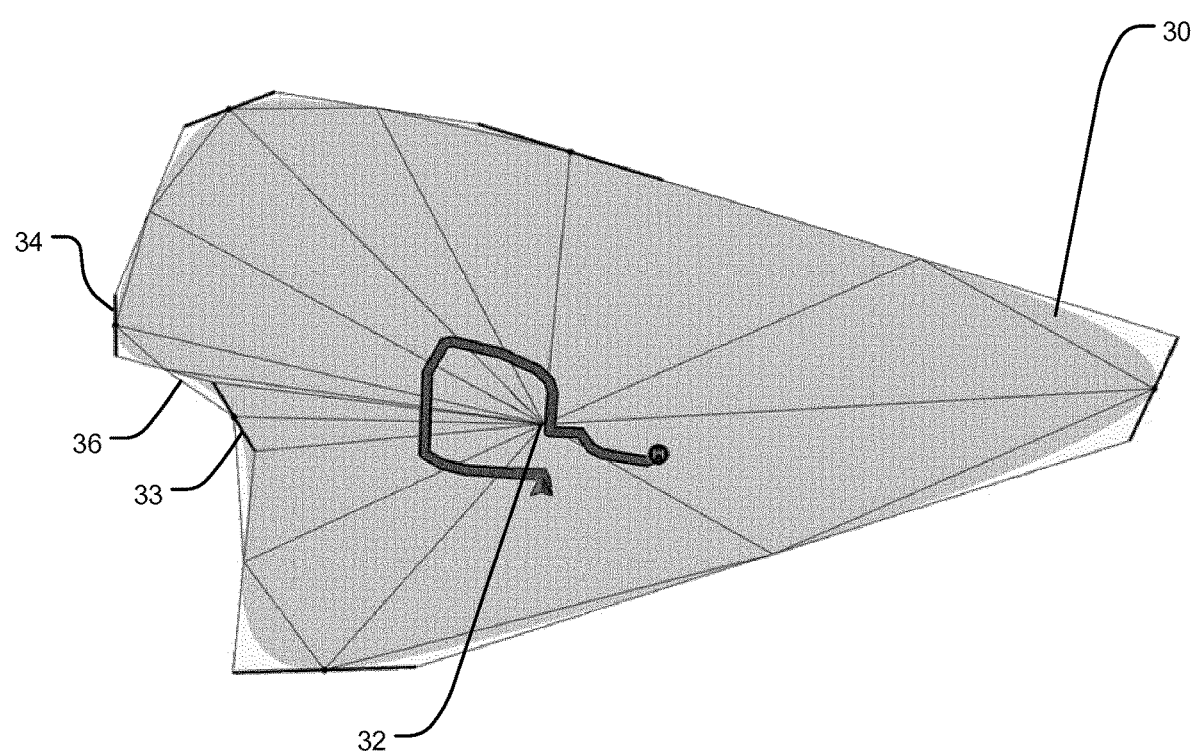
FIG. 3 is an example of how a reachable area may be visualised for display to a user.

FIG. 3 illustrates generally how a reachable area may be visualised. In the case illustrated in FIG. 3, the reachable area around a node 32 is determined by interconnecting a series of maximally reachable points 33, 34. The points may be interconnected directly 36 to provide the boundary of the reachable area. However, for ease of visualisation, it is often better to display the reachable area to a user as a smooth approximation 30. Hence, the connections between the adjacent points 33, 34 around the perimeter of the reachable area may be approximated by arcuate lines to provide a smooth representation of the reachable area 30 for display to a user. This technique may be used for both the visualisation of the currently reachable area from the current position of the device and for the visualisation of the safe return range. If it is desired to display the reachable areas or boundaries around the home location, the same or similar techniques can be used.

Steps 102-105 are typically performed repeatedly, continuously and in real-time as the current location of the electric vehicle (and the current charge level) changes. It will be appreciated that because the current position is changing continually, the route searching algorithm may not have time to explore each of the links or reachable points around the current position, so the areas generated and visualised in these steps may be incomplete.

In the embodiment described above, the reachable areas or boundaries around the home location are stored in the persistent device memory and are re-used, except in exceptional circumstances. Hence, the reachable areas from the home location are determined using only static data in the map and do not account for received live data, e.g. indicating current traffic conditions. This works because it can be assumed that the home location will not change, and the static data can provide a sufficient approximation of the safe return range to reduce the range anxiety of the user. It can be advantageous to store the reachable areas in the persistent memory, and then retrieve these for comparison with locations within the currently reachable range. This may be especially advantageous where the techniques are being performed on a device with limited processing power e.g. a user's smartphone, as it can be computationally expensive to continually re-calculate the reachable areas, unless necessary (e.g. to account for a change in home location, or change in map data). However, it is also contemplated that, for instance when the method is applied on a server such that the processing power is less limited, the reachable area and boundaries around the home location may be re-calculated on a more regular basis, to provide a more accurate approximation, e.g. accounting for current or recent traffic conditions.

Although the present invention has been described with reference to certain embodiments, it will be understood by those skilled in the art that various changes in form and detail may be made without departing from the scope of the invention as set forth in the accompanying claims.

The invention claimed is:

1. A method for determining an area which may be travelled within when travelling between a departure node and a destination node, the area being part of a navigable network represented by an electronic map, the method comprising:
    determining or retrieving data indicative of a first boundary enclosing a first area around the destination node within which is included locations from which a person or vehicle may travel to the destination node given a first value of a parameter, wherein the first value of the parameter is a first fixed value of said parameter that constrains the distance travelable by the person or vehicle;
    estimating a value of said parameter when the person or vehicle is at a first location within the first boundary, other than the departure and destination nodes, based on an initial value of the parameter at the departure node and the estimated change in value of said parameter associated with travelling from the departure node to the first location;
    comparing the estimated value of the parameter at the first location with said first value associated with said first boundary to determine whether said first location can be reached by the person or vehicle from the departure node while still reaching the destination node, given the initial value of the parameter;
    determining, based on a plurality of first locations which can be reached by the person or vehicle from the departure node while still reaching the destination node, the area which may be travelled within when travelling between the departure node and the destination node; and
    displaying, on an electronic map, a representation of the area which may be travelled within when travelling between the departure node and the destination node while still reaching the destination node.

2. The method of claim 1, comprising determining or retrieving data indicative of a plurality of different boundaries around said destination node, each different boundary associated with a different respective fixed value of the parameter, the different boundaries enclosing areas around the destination node within which are included locations from which a person or vehicle may travel to the destination node given the value of the parameter associated with that boundary,
wherein the method further comprises determining between which two adjacent of said boundaries said first location lies, and comparing the estimated value of the parameter at the first location with the value of the parameter associated with the outer boundary and/or the inner boundary of said two adjacent of said boundaries to determine whether the first location can be reached by the person or vehicle from the departure node while still reaching the destination node, given the initial value of the parameter.

3. The method of claim 2, further comprising:
estimating a value of said parameter when the person or vehicle is at a second location within the first boundary and/or between an adjacent two of said plurality of boundaries, other than the departure and destination nodes and the first location, based on an initial value of the parameter at the departure node and the estimated change in value of said parameter associated with travelling from the departure node to the second location; and
comparing the estimated value of the parameter at the second location with said first value associated with said first boundary and/or with the value of the parameter associated with the outer boundary and/or the inner boundary of said adjacent two of said plurality of boundaries to determine whether the second location can be reached by the person or vehicle from the departure node while still reaching the destination node, given the initial value of the parameter.

4. The method of claim 1, comprising determining an area around said departure node representative of the locations from which the person or vehicle may travel from the departure node based on the initial value of the parameter; and
determining, using said first boundary and/or at least some of a plurality of different boundaries around said destination node, for each of a plurality of said locations within said area around said departure node whether each of said plurality of locations can be reached while still reaching the destination node.

5. The method of claim 1, further comprising using the method to create map data comprising locations between the departure node and destination node that can be reached from the departure node whilst still reaching the destination node based on the initial value of the parameter.

6. The method of claim 1, comprising creating map data of, and/or displaying the or an area around, said departure node representative of the range from which the person or vehicle may travel from the departure node based on the initial value of the parameter.

7. The method of claim 1, wherein the departure node is a current position of the person or vehicle, and wherein the initial value is the current value of the parameter.

8. The method of claim 7, wherein the method comprises repeating the steps of estimating the value of the parameter at the first location and comparing the estimated value of the parameter at the first location with said first value associated with said first boundary in real time as the current position and current value of the parameter changes.

9. The method of claim 1, wherein:
(i) said parameter is a fuel load or an electric charge level; and/or
(ii) said parameter is representative of a travel time or a travel distance; and/or
(iii) the first value of the parameter is the travel time or distance from the first boundary to the destination node, the initial value of the parameter is a desired or maximum travel time or distance, and the estimated value of the parameter at the first location is an estimated remaining travel time or distance after travelling from the departure node to the first location.

10. The method of claim 1, wherein the destination node is a fixed location and/or wherein the first boundary or a plurality of different boundaries around the destination node are determined using, or retrieved from, stored or historic data.

11. A device for navigating between a departure node and a destination node, the device comprising:
a memory; and
a processor, wherein the processor is configured to:
determine or retrieve data indicative of a first boundary enclosing a first area around the destination node within which is included locations from which a person or vehicle carrying the device may travel to the destination node given a first value of a parameter, wherein the first value is a first fixed value of said parameter that constrains the distance travelable by the person or vehicle carrying the device;
estimate a value of said parameter when the person or vehicle carrying the device is at a first location within the first boundary, other than the departure and destination nodes, based on an initial value of the parameter at the departure node and the estimated change in value of said parameter associated with travelling from the departure node to the first location;
compare the estimated value of the parameter at the first location with said first value associated with said first boundary to determine whether said first location can be reached by the person or vehicle carrying the device from the departure node while still reaching the destination node, given the initial value of the parameter;
determine, based on a plurality of first locations which can be reached by the person or vehicle from the departure node while still reaching the destination node, the area which may be travelled within when travelling between the departure node and the destination node; and
display, on an electronic map, a representation of the area which may be travelled within when travelling between the departure node and the destination node while still reaching the destination node.

12. The device of claim 11, wherein data indicative of the first boundary enclosing the first area around said destination node is stored in a persistent memory portion of the memory.

13. The device of claim 11, wherein data indicative of the first boundary enclosing the first area around said destination node is retrieved from the server or from an external server.

14. The device of claim 11, wherein the processor is further configured to:
determine or retrieve data indicative of a plurality of different boundaries around said destination node, each different boundary associated with a different respective fixed value of the parameter, the different boundaries enclosing areas around the destination node within which are included locations from which a person or vehicle may travel to the destination node given the value of the parameter associated with that boundary;

determine between which two adjacent of said boundaries said first location lies; and compare the estimated value of the parameter at the first location with the value of the parameter associated with the outer boundary and/or the inner boundary of said two adjacent of said boundaries to determine whether the first location can be reached by the person or vehicle from the departure node while still reaching the destination node, given the initial value of the parameter.

15. The device of claim 14, wherein the processor is further configured to:

estimate a value of said parameter when the person or vehicle is at a second location within the first boundary and/or between an adjacent two of said plurality of boundaries, other than the departure and destination nodes and the first location, based on an initial value of the parameter at the departure node and the estimated change in value of said parameter associated with travelling from the departure node to the second location; and compare the estimated value of the parameter at the second location with said first value associated with said first boundary and/or with the value of the parameter associated with the outer boundary and/or the inner boundary of said adjacent two of said plurality of boundaries to determine whether the second location can be reached by the person or vehicle from the departure node while still reaching the destination node, given the initial value of the parameter.

16. A system for navigating between a departure node and a destination node comprising:

a mobile device having a memory and a processor; and a server, wherein said mobile device is configured to communicate with the server;

wherein said server and/or said processor is arranged and configured to:

determine or retrieve data indicative of first boundary enclosing a first area around the destination node within which is included locations from which a person or vehicle carrying the device may travel to the destination node given a first value of a parameter, wherein the first value is a first fixed value of said parameter that constrains the distance travelable by the person or vehicle carrying the device;

estimate a value of said parameter when the person or vehicle carrying the device is at a first location within the first boundary, other than the departure and destination nodes, based on an initial value of the parameter at the departure node and the estimated change in value of said parameter associated with travelling from the departure node to the first location;

compare the estimated value of the parameter at the first location with said first value associated with said first boundary to determine whether said first location can be reached by the person or vehicle carrying the device from the departure node while still reaching the destination node, given the initial value of the parameter;

determine, based on a plurality of first locations which can be reached by the person or vehicle from the departure node while still reaching the destination node, the area which may be travelled within when travelling between the departure node and the destination node; and display, on an electronic map, a representation of the area which may be travelled within when travelling between the departure node and the destination node while still reaching the destination node.

17. The system of claim 16, wherein said server and/or said processor is arranged and configured to:

determine or retrieve data indicative of a plurality of different boundaries around said destination node, each different boundary associated with a different respective fixed value of the parameter, the different boundaries enclosing areas around the destination node within which are included locations from which a person or vehicle may travel to the destination node given the value of the parameter associated with that boundary, determine between which two adjacent of said boundaries said first location lies; and compare the estimated value of the parameter at the first location with the value of the parameter associated with the outer boundary and/or the inner boundary of said two adjacent of said boundaries to determine whether the first location can be reached by the person or vehicle from the departure node while still reaching the destination node, given the initial value of the parameter.

18. The system of claim 17, wherein said server and/or said processor is arranged and configured to:

estimate a value of said parameter when the person or vehicle is at a second location within the first boundary and/or between an adjacent two of said plurality of boundaries, other than the departure and destination nodes and the first location, based on an initial value of the parameter at the departure node and the estimated change in value of said parameter associated with travelling from the departure node to the second location; and compare the estimated value of the parameter at the second location with said first value associated with said first boundary and/or with the value of the parameter associated with the outer boundary and/or the inner boundary of said adjacent two of said plurality of boundaries to determine whether the second location can be reached by the person or vehicle from the departure node while still reaching the destination node, given the initial value of the parameter.

19. A non-transitory computer readable medium comprising computer readable instructions that, when executed by at least one processor of a device or system, cause the device or system to perform for a method for determining an area which may be travelled within when travelling between a departure node and a destination node, the area being part of a navigable network represented by an electronic map, the method comprising:

determining or retrieving data indicative of a first boundary enclosing a first area around the destination node within which is included locations from which a person or vehicle may travel to the destination node given a first value of a parameter, wherein the first value of the parameter is a first fixed value of said parameter that constrains the distance travelable by the person or vehicle;

estimating a value of said parameter when the person or vehicle is at a first location within the first boundary, other than the departure and destination nodes, based on an initial value of the parameter at the departure node and the estimated change in value of said parameter associated with travelling from the departure node to the first location;

comparing the estimated value of the parameter at the first location with said first value associated with said first boundary to determine whether said first location can be reached by the person or vehicle from the departure node while still reaching the destination node, given the initial value of the parameter;

determining, based on a plurality of first locations which can be reached by the person or vehicle from the departure node while still reaching the destination node, the area which may be travelled within when travelling between the departure node and the destination node; and displaying, on an electronic map, a representation of the area which may be travelled within when travelling between the departure node and the destination node while still reaching the destination node.

20. The non-transitory computer readable medium of claim 19, wherein the method further comprises:

determining or retrieving data indicative of a plurality of different boundaries around said destination node, each different boundary associated with a different respective fixed value of the parameter, the different boundaries enclosing areas around the destination node within which are included locations from which a person or vehicle may travel to the destination node given the value of the parameter associated with that boundary;

determining between which two adjacent of said boundaries said first location lies; and comparing the estimated value of the parameter at the first location with the value of the parameter associated with the outer boundary and/or the inner boundary of said two adjacent of said boundaries to determine whether the first location can be reached by the person or vehicle from the departure node while still reaching the destination node, given the initial value of the parameter.

* * * * *